United States Patent

[11] 3,626,393

[72] Inventor Henry M. Call
Orange, Calif.

[21] Appl. No. 11,235
[22] Filed Feb. 13, 1970
[45] Patented Dec. 7, 1971
[73] Assignee Documentor Sciences Corporation
Santa Ana, Calif.

[54] TEMPERATURE COMPENSATION CIRCUIT FOR MAGNETIC CORE MEMORIES
5 Claims, 2 Drawing Figs.

[52] U.S. Cl. 340/174 SC, 340/174 TB, 340/174 AC
[51] Int. Cl. G11c 5/02, G11c 7/04, G11c 11/06
[50] Field of Search 340/174 M, 174 SC, 174 TB, 174 DA, 174 AC; 330/143, 23

[56] References Cited
UNITED STATES PATENTS
3,354,443 11/1967 Kuhlmann 340/174 SC

*Primary Examiner*—Bernard Konick
*Assistant Examiner*—Steven B. Pokotilow
*Attorney*—Spensley, Horn and Lubitz

ABSTRACT: An electrical circuit to compensate for the change in electrical characteristics of magnetic cores with changes in ambient temperature. In a magnetic core memory system comprising a common inhibit and sense winding, the resistance of the inhibit-winding circuit used to compensate for increases in temperature and its effect upon the characteristics of the magnetic cores.

HENRY M. CALL
INVENTOR.

BY Spensley & Horn
ATTORNEYS

TEMPERATURE COMPENSATION CIRCUIT FOR MAGNETIC CORE MEMORIES

BACKGROUND OF THE INVENTION

1. Field of the Invention

The present invention relates generally to the field of magnetic core memory systems, and more specifically to those electrical circuits used to adapt magnetic core memories to changes in ambient temperature.

2. Prior Art

The increasing use of digital computers has compelled the industry to look for more efficient and less expensive methods to implement the devices. The memory systems used in digital computers have advanced from the original memory devices of mercury delay lines, magnetostrictive delay lines and vacuum tubes to the highly sophisticated magnetic core memory systems in use today. The magnetic core memory systems which are utilized by present day digital computers have enabled read/write rates to exceed 1 megahertz. The increased sophistication of magnetic core memory systems design has brought about increased miniaturization of the memory systems in addition to the substantial reduction in costs. One of the major advances which has been disclosed by the prior art is the advance from the conventional four-wire systems to the three-wire systems. In a four-wire magnetic core memory system, there is one wire for each of the two plane coordinates, and one wire each for the sense and inhibit winding. The advance to the three-wire systems has been brought about by the time shared use of a single wire for the sense and inhibit functions. The use of the three-wire systems has allowed reduction in the size of the cores since the number of wires being used has been reduced.

A problem which has consistently plagued the designers of magnetic core memory systems utilizing a three-wire design is the need to compensate for changes in ambient temperatures. Since an inhibit winding is used to prevent the inadvertent switching of the magnetic state of a magnetic core, the signal on the inhibit line must typically counteract but not exceed that which appears on one of the coordinate selection lines. The prior art has disclosed means to compensate for temperature increases, but the devices disclosed by the prior art are inefficient and expensive. The devices disclosed by the prior art have solved the problem of temperature compensation by changing the voltage which is used to supply power to the inhibit drivers. The present invention eliminates the need for complex and expensive compensation devices by utilizing the combined resistance in the inhibit winding and the current-limiting circuit with its inherent change in resistance with changes in ambient temperature.

SUMMARY OF THE INVENTION

It is an object of the present invention to provide a temperature compensation member for a magnetic core memory system.

It is another object of the present invention to adapt the inhibit current of a magnetic core memory system to changes in ambient temperature.

It is yet another object of the present invention to utilize the resistance of the inhibit winding of a magnetic core memory system to adapt the inhibit current to changes in ambient temperature.

The economics of manufacturing digital computers has dictated that the cost of computers be reduced in line with the need for miniaturization of the computers. The need to reduce the cost and size of temperature compensation equipment is one element in the overall attack on size and expense. The three-wire design technique requires the timesharing of one wire for the inhibit and sense function.

In a majority of the magnetic core memory systems, a rectangular hysteresis loop is a highly desirable feature. In fact, some of the systems depend on an approximately rectangular loop for successful operations. The characteristics of the hysteresis loop provide the magnetic core with a binary storage function in that the remnant flux in the core is in one direction or the other, the direction being dependent upon the direction of the last previously applied magnetomotive force. The magnetomotive force shall hereinafter be understood to be represented by "MMF." The core is to store a one or a zero in accordance with the direction of this flux. To sense the status of the core, it is necessary to send a current through a winding on the core and thereby apply an MMF which will reset the core to one state or the other (typically to zero). The signal for indicating the initial status of the core appears as an induced voltage at a second winding on the core. If the core initially contained a one, the change in flux in the core will create an induced voltage, but if the core initially contained a zero, there will be no change in flux and therefore no induced output voltage. The third winding of the present invention system, used herein as a combined inhibit/sense winding, will detect the change in flux. The reading or writing of a core is initiated by the pair of coordinate selection wires. Each wire carries one-half the current needed to change the state of flux of the core. To provide more efficient operation, an inhibit function is used to prevent inadvertent switching of the state of the core. Where there are two wires which will carry signals which will change the state of the core, close control of the various signal currents is a much more severe problem. The inhibit function is executed by providing a current signal of opposite polarity to a signal on one of the coincident current lines. The inhibiting current should not be so great that it surpasses the reading and writing current. In fact, the inhibiting current should not reduce the net MMF to a value less than that which is sufficient to set the core in the required amount of time. To bring about this result, the prior art had to closely control the voltage which was used to drive the inhibit line-driving circuit.

The present invention utilizes a combination of the limiting resistors and inhibit line resistance to control the inhibit current during changes in the ambient temperature. When the temperature increases, the characteristics of the hysteresis loop are altered such that less current is required to change the state of the core. To insure that the inhibiting current does not override the setting currents, the inhibit current should also be reduced. To bring about this result, the present invention utilizes the increase in resistance of the inhibit/sense winding. The increase in the resistance of the inhibit/sense winding in combination with the series resistance will reduce the inhibit current and prevent the inhibit current from overriding the setting currents.

The novel features which are believed to be characteristic of the invention, both as to its organization and method of operation, together with further objectives and advantages thereof will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

DESCRIPTION OF THE PRESENTLY PREFERRED EMBODIMENT

Figure 1:
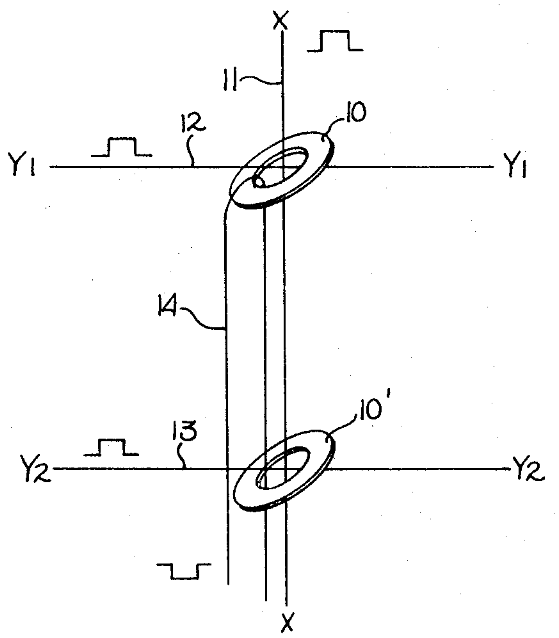
FIG. 1 is an enlarged view of a schematic diagram of a pair of magnetic cores being intercepted pursuant to a three-wire technique.

A better understanding of the wiring of a three-wire magnetic core array can be best obtained by reference to FIG. 1. Two magnetic cores 10 are shown in the exemplary view, magnetic core 10 being intercepted by the $Y_1$ coordinate 12 and the X coordinate 11 and magnetic core 10' being intercepted by the $Y_2$ coordinate 13 and the X coordinate 11. Magnetic cores 10 and 10′ are also shown to be intercepted by the third wire 13 which is the timeshared inhibit/sense line. In the typical operation of a magnetic core memory, a number of magnetic cores are selected for reading or writing, the number selected usually being identified as a data word, byte or other conventional data organization. The data word is selected by the initiation of a one-half current pulse on the word line which would here be designated by the X coordinate 11 and half-current pulses at the byte lines which would here be designated by the $Y_1$ coordinate 12 and $Y_2$ coordinate 13. The magnetic cores 10 and 10′ have a characteristic hysteresis loop which makes them amenable to perform a binary storage function. Upon coincidence of the two half current pulses, magnetic cores 10 or 10′ can be made to change the direction of the magnetic flux and therefore change the stored data. The core is said to store a one or zero in accordance with the direction of the flux. To sense the status of a core, it is necessary to send a current through the coincident winding and thereby apply an MMF which will reset the core to one state or the other. In this case, the inhibit/sense line 14 is used to sense the status of the magnetic cores 10 and 10′. If the core initially contained a one, the change in the flux in the core will create an induced voltage, but if the core initially contained a zero, there will be no change in flux and therefore no induced output voltage. The inhibit function prevents a change in the state of magnetic cores 10 and 10′, during the appropriate time periods. When a core is to be prevented from changing state upon the coincidence of the two half current pulses, a current pulse opposite in polarity to that appearing on the coordinate lines will reduce the net MMF below that required to change the direction of the magnetic flux in the specific magnetic core.

Figure 2:
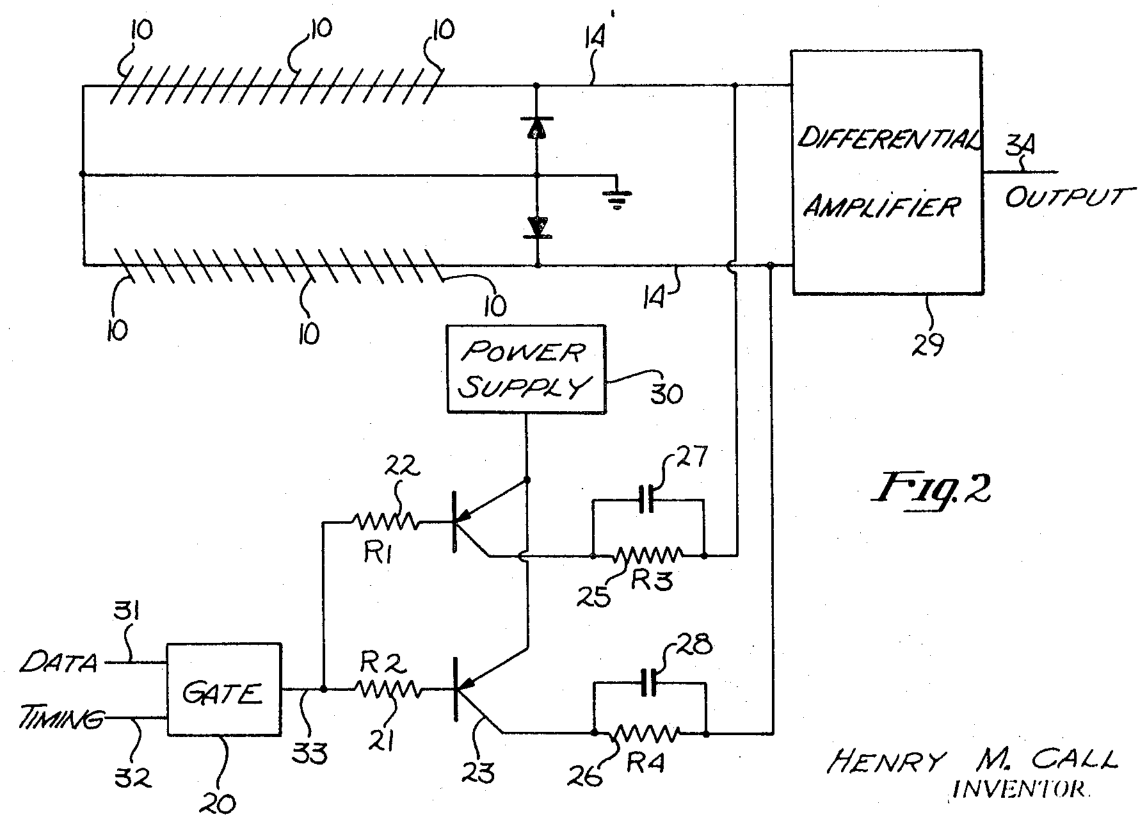
FIG. 2 is a schematic diagram of an inhibit/sense circuit in accordance with the present invention.

The present invention can be best understood by referring to FIG. 2 wherein a typical inhibit/sense circuit is shown therein. A data input 31 and timing input 32 provide the input data necessary to provide the adequate timing signals to initiate the logical action of gate 20. Upon the coincidence of a timing pulse and a data pulse of the proper logical state, an inhibit pulse will appear on line 33. Biasing resistors 21 and 22 set the input levels for transistors 23 and 24 respectively thereby triggering the inhibit pulse. Power supply 30 provides the driving force for the inhibit circuit. When an inhibit pulse is initiated, a current pulse will appear on lines 14 and 14′, the current being limited only by the limiting resistors 25 and 26 and the resistance present in the conducting lines 14 and 14′. The inhibit/sense lines 14 and 14′ are shown to intercept an exemplary number of magnetic cores 10.

Differential amplifier 29 is used to sense the effects of the change of magnetic flux in the core 10 and can be similar to that which would be used with a continuous sense winding in a four-wire memory design, the specific type of differential amplifier being used not being part of the present invention.

The inhibit circuit controls the inhibit current appearing on lines 14 and 14′ and therefore compensates for any change in the magnetic core 10 characteristics which would occur due to a change in the ambient temperature. When there is an increase in the ambient temperature, the magnetic characteristics of the magnetic cores 10 will be altered. The particular characteristic which is relevant herein concerns the amount of coincident current which is required to change the direction of magnetic flux. The inhibit current-limiting resistors 25 and 26 are in series with a resistance which is equal to one-half of the resistance of the inhibit/sense winding 14 and 14′. The resistance of the inhibit/sense lines 14 and 14′ arise from the nonideal electrical characteristics of the line. The inhibit/sense lines 14 and 14′ are conductive members adapted to be integrated into a memory core system, and is typically fabricated of copper therefore the resistance of the line will increase approximately 0.4 percent per degree Centigrade rise in the ambient temperature. The desired temperature coefficient for the inhibit current is approximately 1.3 milliamperes per degree Centigrade. A selected series combination for the inhibit resistors 25 and 26 and the line resistance $R_s$ will provide the desired temperature coefficient.

The inhibit current can be represented by the equation:

$$I=\frac{V}{R_{(25\ \text{or}\ 26)}+R_s}$$

where $V$=+5 volts $R_{(25\ or\ 26)}$=3.92 ohms $R_s$=10 ohms

The values stated hereinabove are typical of those which would be suitable to implement the present invention. When the ambient temperature rises, those devices disclosed by the prior art would necessitate reducing the output of the power supply 30 to thereby reduce the value of the inhibit current. The present invention dictates selection of the limiting resistors $R_{(25\ or\ 26)}$ to cooperatively interact with the resistance of the inhibit lines 14 and 14′. Operation of the inhibit circuit in accordance with the present invention will result in a decrease in inhibit current by the conjunctive, combined resistance of the limiting resistors 25 and 26 and the increased resistance of the inhibit lines 14 and 14′ brought about by the increase in ambient temperature.

I claim:

1. In combination with a magnetic core array, an improved inhibit/sense electrical circuit, the improvement comprising:
   a. temperature-compensating means in cooperative relation with the magnetic core array, said temperature-compensating means for limiting the inhibit current applied to said magnetic core array;
   b. transistor driving means having an input terminal and a pair of output terminals, said transistor driving means for providing the inhibit current;
   c. a pair of limiting resistors, each having a first and second terminal, the first terminal of each of said limiting resistors connected to one of the output terminals of said transistor driving means, the second terminal of each of said limiting resistors connected to said temperature compensating means; and
   d. magnetic flux sensing means for detecting the change of state of a portion of said magnetic core array, said magnetic flux sensing means connected to said temperature-compensating means.

2. An improved inhibit/sense electrical circuit as in claim 1 wherein said temperature-compensating means is an electrical conductor, the electrical resistance of which increases with an increase in ambient temperatures.

3. An improved inhibit/sense electrical circuit as in claim 1 wherein said magnetic flux sensing means is a differential amplifier.

4. In combination with a magnetic core array, an improved inhibit/sense electrical circuit, the improvement comprising:
   a. transistor-driving means having an input and a pair of output terminals, said transistor-driving means for providing inhibit current;
   b. a pair of limiting resistors, each having a first terminal and second terminal, the first terminal of each of said limiting resistors coupled to one of the output terminals of said transistor-driving means;
   c. magnetic flux sensing means for detecting the changes of state of a portion of the magnetic core array; and
   d. a pair of electrical conductors the electrical resistance of which increases with the increase in ambient temperature, each of said electrical conductors connected to the second terminal of one of said limiting resistors and said magnetic flux sensing means, and in cooperative relationship with a portion of said magnetic core array.

5. An improved inhibit/sense electrical circuit as in claim 4 wherein said magnetic flux sensing means is a differential amplifier.

* * * * *